Oct. 25, 1966   J. J. McCARTHY   3,280,439
MECHANICAL COUPLING
Filed April 16, 1964   2 Sheets-Sheet 2
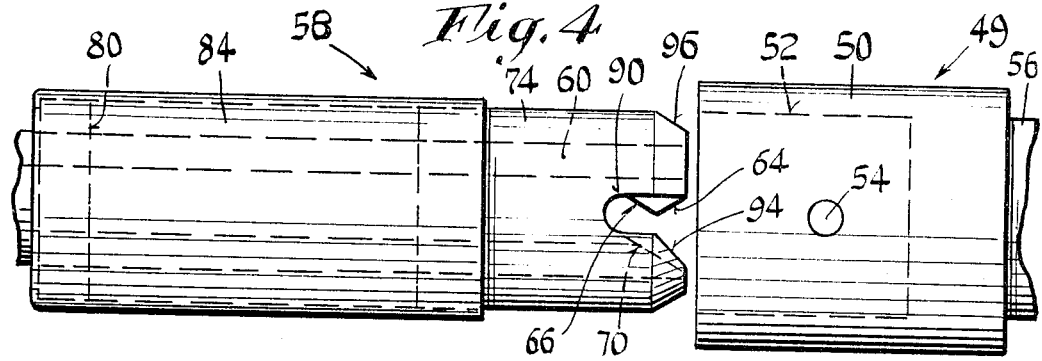
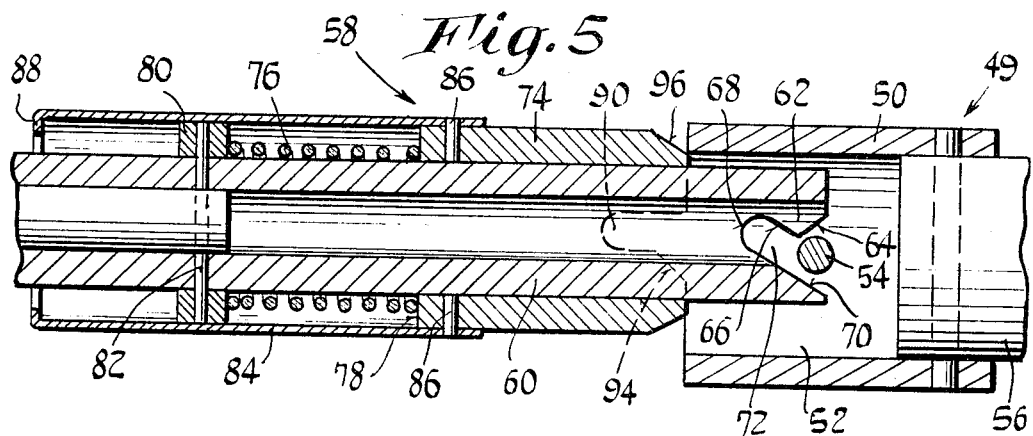
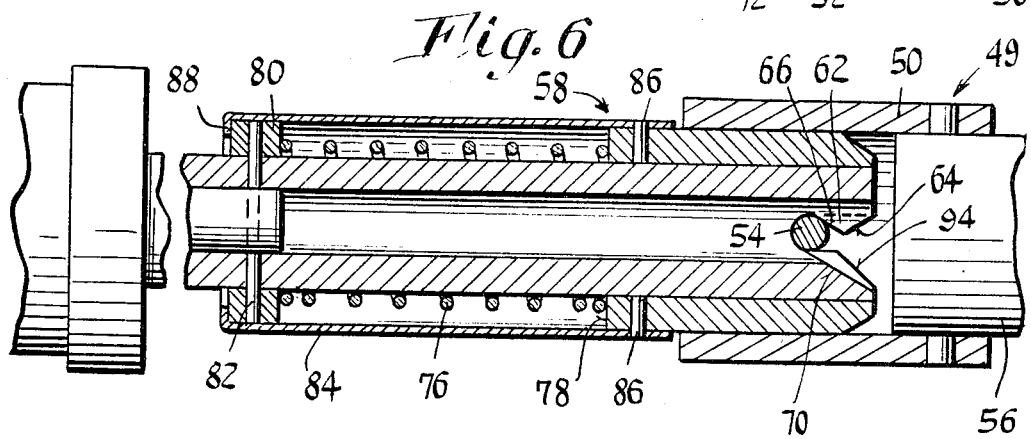
INVENTOR.
John J. McCarthy
BY
H. Gibner Lehmann
AGENT

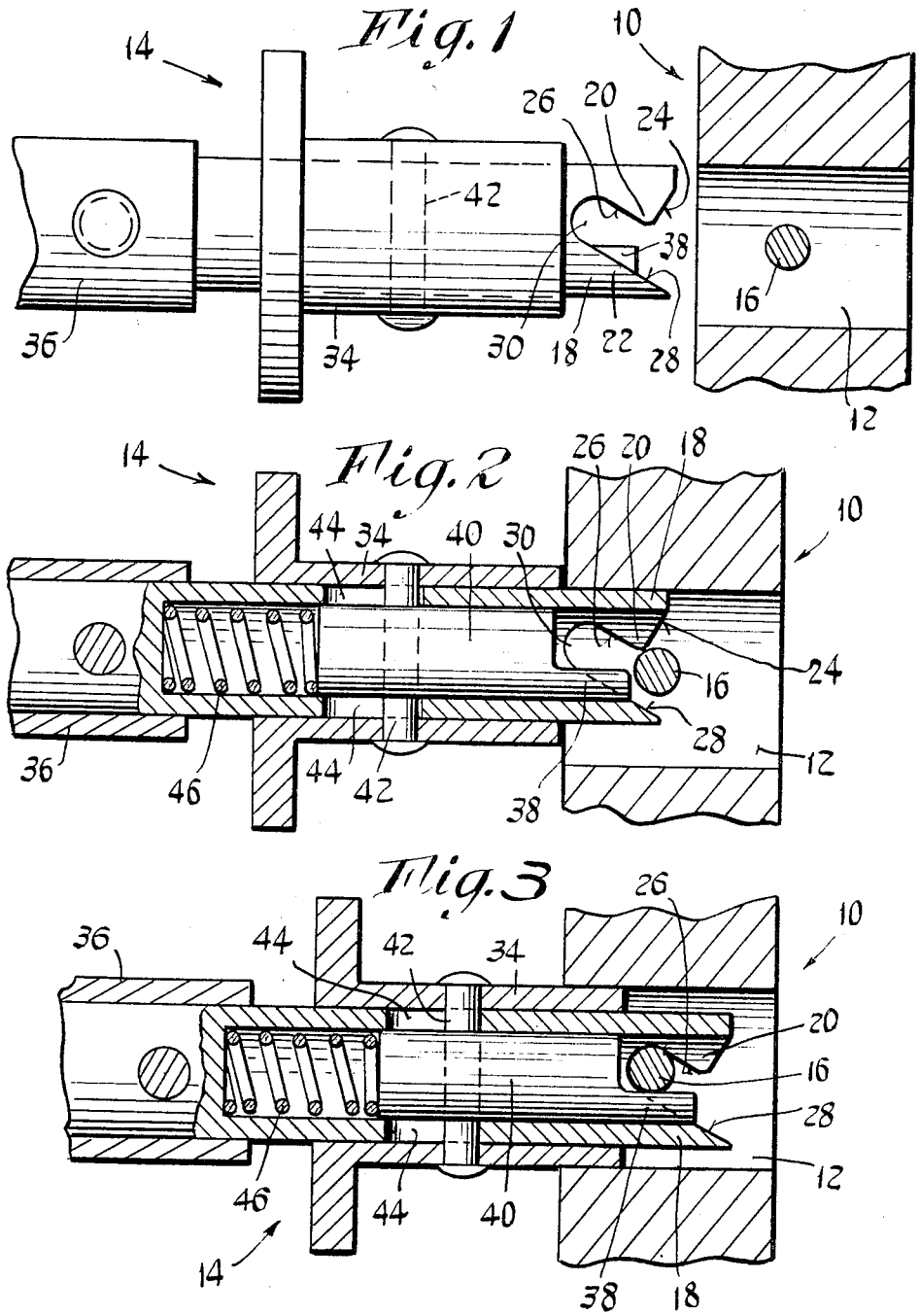

United States Patent Office

3,280,439
Patented Oct. 25, 1966

3,280,439
MECHANICAL COUPLING
John J. McCarthy, Weston, Conn., assignor to Norco Incorporated, Ridgefield, Conn., a corporation of Connecticut
Filed Apr. 16, 1964, Ser. No. 360,356
10 Claims. (Cl. 24—211)

This invention relates to mechanical couplings, and more particularly to separable couplings of the quick-connect and quick-disconnect type.

An object of the invention is to provide a novel and improved quick-connect and disconnect coupling of the type having interlocking elements, wherein a double-acting retention of the separable parts is effected, thereby to enable the coupling to withstand increased loads while at the same time providing an added factor against failure.

Another object of the invention is to provide an improved mechanical coupling as above set forth, wherein certain loose fits are necessary to the securement and release of the parts yet a high degree of rigidity and lack of looseness characterizes the coupling when assembled.

A feature of the invention resides in the provision of an improved coupling as characterized, wherein a manually operable release element functions to both eliminate the above mentioned looseness and to provide the additional retention means when the coupling is in the assembled condition, said element being actuated to effect the release of the coupling parts.

An additional object of the invention is to provide an improved coupling as outlined, which is assembled by the simple act of aligning the cooperable parts and bringing these together with a continuous motion while they remain in the said alignment, there being meanwhile maintained a predetermined orientation of the parts.

A further object of the invention is to provide an improved coupling in accordance with the foregoing, wherein a strong and positive connection is effected between the coupling parts, yet release may be quickly and easily accomplished by a relatively small effort or force which is exerted in the same direction which tends to separate the parts.

Another feature of the invention resides in the provision of an improved coupling as set forth, wherein with one embodiment the coupling parts may be assembled to each other when maintained in only one relative orientation, and with another embodiment the parts may be assembled when held in either of two different orientations, said orientations involving predetermined relative angular positions of the parts.

Yet another feature of the invention resides in the provision of an improved coupling as outlined, wherein the cooperable coupling elements are wholly enclosed and protected when the coupling is assembled.

Other features of the invention reside in the provision of an improved coupling organization which involves relatively few parts of simple construction, the structures being economical to fabricate and reliable and foolproof in operation.

Other features and advantages will hereinafter appear.

In the drawings accompanying this specification, similar characters of reference are used to designate like components throughout the several views, in which:

FIG. 1 is a view partly in side elevation and partly in section, showing two coupling parts as provided by the invention, prior to their assembly.

FIG. 2 is an axial sectional view of the coupling parts of FIG. 1, showing an intermediate stage in the assembly of the parts.

FIG. 3 is a fragmentary sectional view of the coupling parts of FIGS. 1 and 2, shown completely assembled.

FIG. 4 is a side elevational view of two cooperable dissasembled coupling parts constituting another embodiment of the invention.

FIG. 5 is an axial sectional view of the coupling parts of FIG. 4, illustrating an intermediate stage in the assembly of the parts.

FIG. 6 is an axial sectional view similar to that of FIG. 5, but showing the coupling parts in their fully assembled positions.

Referring first to FIGS. 1–3, the coupling illustrated therein comprises a receiver part designated generally by the numeral 10, said part having an aperture or through opening 12 constituted as a socket, for receiving a cooperable plug part which is designated generally by the numeral 14. Located in the socket 12 is a projection, which is shown here as in the form of a transverse locking pin 16 disposed slightly to one side of a diameter of the socket, the latter being of cylindrical configuration. Corresponding to such configuration of the socket 12, the plug part 14 is formed generally of cylindrical components. However, it will be understood that the socket and the plug parts may have other cross sectional configurations, as for example a rectangular configuration, a square configuration, a triangular configuration, etc.

For cooperation with the locking pin 16 and arranged to have a loose sliding fit in the socket 12 is an inner plug part 18, here shown in the form of a cylindrical-walled tube. The plug part 18 has a notched end formed by two pairs of opposing internally facing walls, a pair of protuberant side wall portions 20 and an opposing pair of side wall portions 22. The protuberant wall portions 20 have forwardly located angularly disposed wall surfaces 24 and oppositely sloped rearwardly facing wall surfaces 26, the latter being shaped to constitute a nest in the walls 20 for the transverse locking pin 16. The wall portions 22 of the plug 18 have sloping wall surfaces 28 which in conjunction with the rearwardly facing wall surfaces 26 form angularly extended slots 30 into which the transverse pin or projection 16 may be received.

The forwardly facing wall surfaces 24, 28 constitute a guide means or mouth, in which the transverse pin 16 is received during the assembly of the coupling device, as is illustrated in FIG. 2. To enable the locking pin 16 to enter the slot 30 and the nest provided for it in the protuberant wall portions 20 of the plug, the latter is made to have a loose fit in the socket 12, as may be seen from an inspection of FIG. 2, such loose fit enabling the plug to have a sidewise movement whereby the locking pin 16 may bypass or shift past the nose or protuberant wall portions 20 of the plug.

Further, in accordance with the invention, the plug part 14 includes an axially shiftable sleeve or collar 34 which closely slidably fits and slides on the inner plug part 18 which has the slots 30. The collar 34 is also arranged to closely slidably fit in the socket 12 of the receiver part 10, and is spring-biased to a forward position (FIG. 1) so as to be automatically shifted to such position in the receiver part upon attainment of the nested position by the locking pin 16, this action being also clearly depicted in FIG. 3. It is noted that during the assembly movement of the two coupling parts, the transverse locking pin 16 will be guided by the sloping surfaces 24, 28 of the plug part, so as to ultimately be disposed in the slot 30 and nest of the plug part. Upon such disposition, the inner plug part 18 will attain a centered position in the socket 12, providing uniform clearance between the socket and inner part, which clearance is now occupied by the spring-urged collar 34.

This disposition of the collar 34, as shown in FIG. 3, prevents any appreciable sidewise movement of the slotted plug part 18, and accordingly the latter is locked in the socket 12 by virtue of the locking pin 16 being retained in the slot 30 and being prevented from leaving the latter.

The plug part 18 is secured to a shank 36 as shown, and the receiver part 10 may be fastened to any desired machine component, structural element or the like, which is to be releasably coupled to the shank 36 or to another structural element or machine component connected with the shank.

Considering FIG. 3, for the purpose of releasing the coupling parts comprising the receiver 10 and the plug 14 from each other it is merely necessary to apply an axial force to the collar 34 in a direction from right to left, which (it is to be noted) tends to separate the coupling parts. The first thing which takes place is a shifting of the collar 34 out of the socket 12. After this has occurred, the inner plug part 18 is free to have sidewise movement. Because of the sloping disposition of the wall surfaces 26, a continued pull exerted on the retracted collar 34 will now cause the inner plug part 18 to shift sidewise and at the same time to shift or move axially from right to left, the locking pin 16 leaving the slot 30. Continued movement of the plug part 14 will thus separate the coupling parts, and the release of the coupling in this manner is also illustrated in FIG. 2, which may be considered as showing a part of the releasing movement.

In accordance with the invention, there is provided an additional locking or detent action, beyond that effected by the collar 34 which takes up the looseness in the socket 12. The additional detent or locking action is provided by an axially movable pin 38 which is axially shiftable in the inner plug part 18 and is arranged to obstruct the departure path of the cross pin 16. The locking member 38 comprises a portion of a cylindrical slide 40 which closely slidably fits in the plug member 18 and which is connected rigidly to the collar 34 by means of a connector pin 42 passing through slots 44 in the plug member 18.

A helical coil spring 46 disposed in the bore of the inner plug member 18 normally biases the locking member 38, 40 as well as the collar 34 to advanced positions, such as those shown in FIGS. 1 and 3. In FIG. 2, the biasing spring 46 is slightly compressed, by virtue of the collar 34 having been shifted a small extent toward its retracted position due to entry of the plug part 18 in the socket 12. During the assembly movement of the two coupling parts, the transverse locking pin 16 will be guided by the sloping surfaces 24, 28 of the plug part into contact with the squared end portion of the locking member 38 (see FIG. 2) so as to squarely abut and push inward the latter; thus the pin 16 can ultimately be most easily disposed in the slot or nest 30 of the plug part. As seen in FIG. 3, upon completion of the assembly of the coupling parts, the advance of the collar 34 will be accompanied by a corresponding advance of the locking member 38, 40 whereby the portion 38 will extend partially across the mouth of the slot 30, obstructing the return path of the locking pin 16 and preventing it from leaving the slot. Accordingly, a double locking or detent action is effected in the coupling, one action consisting of the blocking of the slot 30 as mentioned immediately above, whereas the other action resides in the bushing effect provided by the collar 34, which prevents sidewise movement of the inner coupling part 18. By virtue of such double detent action an extremely reliable locking of the coupling parts is had by the simple simultaneous axial movement of the locking member 38, 40 and the collar 34.

The release of the coupling parts 10, 14 as equipped with the locking member 38, 40 is the same as already described above. Upon retraction of the collar 34 in consequence of a right to left force being exerted thereon, the locking member 38, 40 will also be retracted whereby the inner plug part 18 is freed to enable its removal to be effected. Such removal sequence may be considered as shown in FIGS. 2 and 1 respectively.

In the embodiment of the invention illustrated in FIGS. 1–3, the eccentric or off-center position of the locking pin 16 imposes a requirement that the plug member 14 be inserted in the socket 12 while in one given relative rotative position or orientation, that which is illustrated in the figures. It is apparent that for any other rotative position or orientation the plug member 14 will not be fully insertable in the receiver member 10. Use is made of this characteristic in those situations where it is essential that the coupling parts be brought together in only one particular orientation. This is of advantage where the structural members or machine components which are to be connected by the coupling must occupy but a single relative position.

Another embodiment of the invention wherein the coupling parts are capable of being assembled in either of two different rotative positions or orientations, each 180° separated from the other, is illustrated in FIGS. 4–6. In effecting this, the locking pin which is carried by the receiver part is centrally located, that is, disposed along a diameter and the plug part is correspondingly altered to accommodate the changed disposition of the locking pin. Also, in the embodiment of FIGS. 4–6 the second detent or locking instrumentality which in FIGS. 1–3 comprised the separate locking member 38, 40 is eliminated, and instead the second locking or detent function is assumed by the same slidable collar element which takes up the initial looseness between the receiver and the plug parts.

Referring now to FIGS. 4–6 the receiver part, which is designated generally by the numeral 49, comprises a tubular member 50 of cylindrical configuration having a recess or socket 52 in which there is disposed a diametrically located locking pin 54. The member 50 is carried on a shank 56 which may be secured to a machine component or other structural member, as will be understood. The receiver part comprising the shank 56 and tubular member 50, while being preferably of cylindrical configuration, may have other cross-sectional shapes, and this is also true of the plug part of the coupling, which is designated generally by the numeral 58.

The plug part 58 comprises an inner tubular plug member 60 having a notched end formed by protuberant side wall portions 62 having forwardly facing angular wall surfaces 64 and rearwardly facing angular wall surfaces 66, the wall portions 62 providing a nesting configuration 68 adapted to receive the locking member 54 when the coupling parts are in the assembled position as shown in FIG. 6. The plug part 60 has a pair of forwardly facing sloping wall surfaces 70 disposed opposite the protuberant wall portions 62, which with the latter form a pin-receiving slot or notch 72 as clearly seen in FIG. 5.

Slidably carried on the inner plug part 60 is an axially movable locking collar 74 which is spring-urged to an advanced position as shown in FIGS. 4 and 6, by means of a helical compression coil spring 76. The spring 76 engages the rear edge 78 of the collar 74, and also a stop ring or annulus 80 secured to the inner plug member 60 by a cross pin 82.

A sleeve 84 surrounds the coil spring 76 and also the rear end portion of the collar 74, being secured thereto by small fastening pins 86. The back end of the sleeve 84 has an inturned flange 88 to limit the extent of forward movement of the collar 74, as will be understood from an inspection of FIG. 6.

As with the previously described embodiment of the invention, the inner plug part 60 is loosely received in the coupling part 49, and the locking collar 74 is adapted to occupy the separating space whereby looseness is eliminated and a fairly rigid connection or coupling is established, as may be seen in FIG. 6.

The presence of the collar 74 in the socket 52 prevents sidewise movement of the inner plug part 60 whereby the cross pin 54 may not shift out of the nest 68 and slot 72 of the inner plug member. Accordingly, such member is securely retained in the receiver member 50.

An additional or second detent action is provided by the collar 74, by the provision of a notched end on such collar, adapted to extend on opposite sides of the locking pin 54 when the coupling parts are assembled as seen in FIG. 6. Two axially extending slots or notches 90 are provided at the notched end, one edge of each of said notches having a sloping guide surface 94 which, cooperating with an edge 64 of the plug member 60 constitutes a guide for the locking pin 54.

The collar 74 has a chamfered or tapered nose portion 96 to facilitate its entry in the socket 52. The assembling and releasing action of the coupling of FIGS. 4–6 is similar in general to that already described in connection with the embodiment of FIGS. 1–3. A stage of the assembly movement is shown in FIG. 5, wherein the locking collar 74 is being retracted by its engagement with the front edge of the receiver member 50. Meanwhile, the locking pin 54 is being received in the slots 72 of the plug member 60. Upon the locking pin being fully received in the nest 68, the plug member 60 will be centralized and the coil spring 76 can now shift the locking collar 74 to its foremost, locking position as shown in FIG. 6. Release of the coupling is effected by merely pulling on the sleeve 84, to retract the locking collar 74.

By virtue of the centralized position of the locking pin 54, the plug part 58 may be inserted in the socket 52 of the receiver part 49 in either of two rotative positions 180° apart, as will be readily understood. This is of advantage where the structures which are to be secured together must be maintained in an orientation having either of two relative positions which are spaced apart by a half-turn.

It will now be understood from the foregoing that I have provided a novel and improved quick-connect and disconnect coupling device characterized by relatively few parts, which are simple to fabricate and assemble. The locking device is strong and sturdy in construction, and exceptionally reliable in its operation, providing for a secure fastening of the two coupling parts and for easy and quick release when this is desired.

The coupling parts depend for assembly upon an initial looseness of the plug part in the receiver part, such looseness being taken up and eliminated by the locking collar provided by the invention. In both embodiments, the locking collar is retained in its advanced, locking position by spring means whereby there is no likelihood of vibration or severe operating conditions causing a release of the coupling.

Variations and modifications may be made within the scope of the claims, and portions of the improvements may be used without others.

I claim:
1. A releasable coupling comprising, in combination:
    (a) a receiver part having a socket and having a projection fixed in the socket, said projection having portions spaced from the side walls of the socket, thereby providing an intervening space between the projection portions and the socket side wall,
    (b) a plug part insertable in the receiver part, having a protuberant side wall portion insertable in said intervening space and engageable with a side of the said projection, said protuberant side wall portion being shaped to nest the projection when the plug part is inserted in the socket and the protuberant side wall portion is moved sidewise in said intervening space to bring the side wall portion into engagement with the projection, and
    (c) a collar axially movable on and closely fitting around the plug part, said collar being arranged to occupy an advanced position wherein it closely and slidably fits into the socket in a position adjoining said intervening space while still on the plug part, and after insertion of the same into the socket and after completion of said sidewise movement, said collar preventing an opposite sidewise movement of the plug part in the socket and thereby effecting a locking of the side wall portion of the plug part in said intervening space by the nesting engagement of the projection and side wall portion.
2. A coupling as in claim 1, wherein:
    (a) a locking member is provided for engagement with another side of the said projection to lock the same in said nested position,
    (b) said locking member being carried by the plug part and being movable thereon between an advanced position engaged with the projection and locking the latter in nested position and a retracted position wherein it disengages and releases the projection,
    (c) said locking member being connected to the said collar to be actuated thereby to the advanced position in response to shifting of the collar into the said socket.
3. A coupling as in claim 2, wherein:
    (a) the locking member comprises a wall portion of the collar.
4. A coupling as in claim 3, wherein:
    (a) spring means are provided, biasing the collar toward its advanced position,
    (b) said spring means surrounding the plug part and engaging one end of the collar, and
    (c) a tubular cover is provided, enclosing the spring means and secured to the collar,
    (d) said cover slidably engaging the plug part and constituting a handle to effect shifting of the collar from the advanced position thereof.
5. A coupling as in claim 2, wherein:
    (a) the plug part has an axial bore,
    (b) the locking member comprises a pin axially slidable in the bore of the plug part, and
    (c) spring means are provided, biasing the pin and collar toward their advanced positions.
6. A coupling as in claim 5, wherein:
    (a) the spring means is disposed in the bore of the plug part,
    (b) said plug part has a slot in the wall defining the bore, and
    (c) a connector pin is provided, extending through said slot and joining the collar to the locking pin.
7. A coupling as in claim 1, wherein:
    (a) the collar has a taper at the end which first engages the socket, said taper providing a reduced outside diameter to facilitate entry of the collar in the socket.
8. A coupling as in claim 1, wherein:
    (a) the plug part has a slotted end,
    (b) one wall of the slot constituting the said protuberant side wall portion, and
    (c) an opposite wall of the slot sloping with respect to the axis of the plug part and constituting a guide to facilitate entry in the slot of the projection and engagement thereof with the protuberant side wall.
9. A coupling as in claim 2, wherein:
    (a) the plug part has a slotted end,
    (b) one wall of the slot constituting the said protuberant side wall portion,
    (c) an opposite wall of the slot sloping with respect to the axis of the plug part and constituting a guide to facilitate entry in the slot of the projection and engagement thereof with the protuberant side wall,
    (d) the slotted end of the plug part has an axial bore,
    (e) said bore dividing the protuberant side wall portion and the said opposite wall each into halves which are respectively cooperable in guiding and nesting the projection,
    (f) said locking member comprising a pin slidably carried in the axial bore of the plug part.
10. A releasable coupling comprising, in combination:
    (a) a tubular plug part having a wide-mouthed notch provided with wide-angled opposite, outwardly-divergent guide surfaces,
    (b) said notch extending transversely of the axis of the plug part and making an acute angle with said axis,
    (c) a projection receivable and nestable in said notch, and

(d) a locking and release member slidable axially in the plug part and having a foremost end movable from a retracted position in an advancing direction past portions of said notch to a locking position to block and prevent removal of the projection when the latter is fully nested in the notch, (e) yieldable means biasing said locking and release member to and yieldably holding it in said locking position, said end of the locking and release member being normally disposed in said notch when said member is in the locking position, and said end being cut off squarely to provide an abuttable surface against which the entering projection can impinge after being guided thereto by one or both of said guide surfaces, thereby to facilitate retraction of the locking and release member and insertion of the projection fully into the said noch.

References Cited by the Examiner

UNITED STATES PATENTS

| | | | |
|---|---|---|---|
| 346,906 | 8/1886 | Hale | 24—239 X |
| 938,267 | 10/1909 | Morris | 24—239 X |
| 2,560,513 | 7/1951 | Lyon | 287—119 X |
| 2,948,383 | 8/1960 | Modrey | 24—211 X |
| 3,110,072 | 11/1963 | Carreberg | 24—239 |
| 3,171,666 | 3/1965 | Benjamin et al. | 287—103 X |

FOREIGN PATENTS

| | | |
|---|---|---|
| 269,081 | 1/1914 | Germany. |
| 480,927 | 8/1929 | Germany. |
| 162,541 | 9/1933 | Switzerland. |

WILLIAM FELDMAN, *Primary Examiner.*

E. SIMONSEN, *Assistant Examiner.*